Mar. 13, 1923.

A. T. BROWN.
DRIVING AXLE CONSTRUCTION.
FILED MAR. 5, 1918.

INVENTOR
Alexander T. Brown

BY
Parsons & Bodell
ATTORNEYS

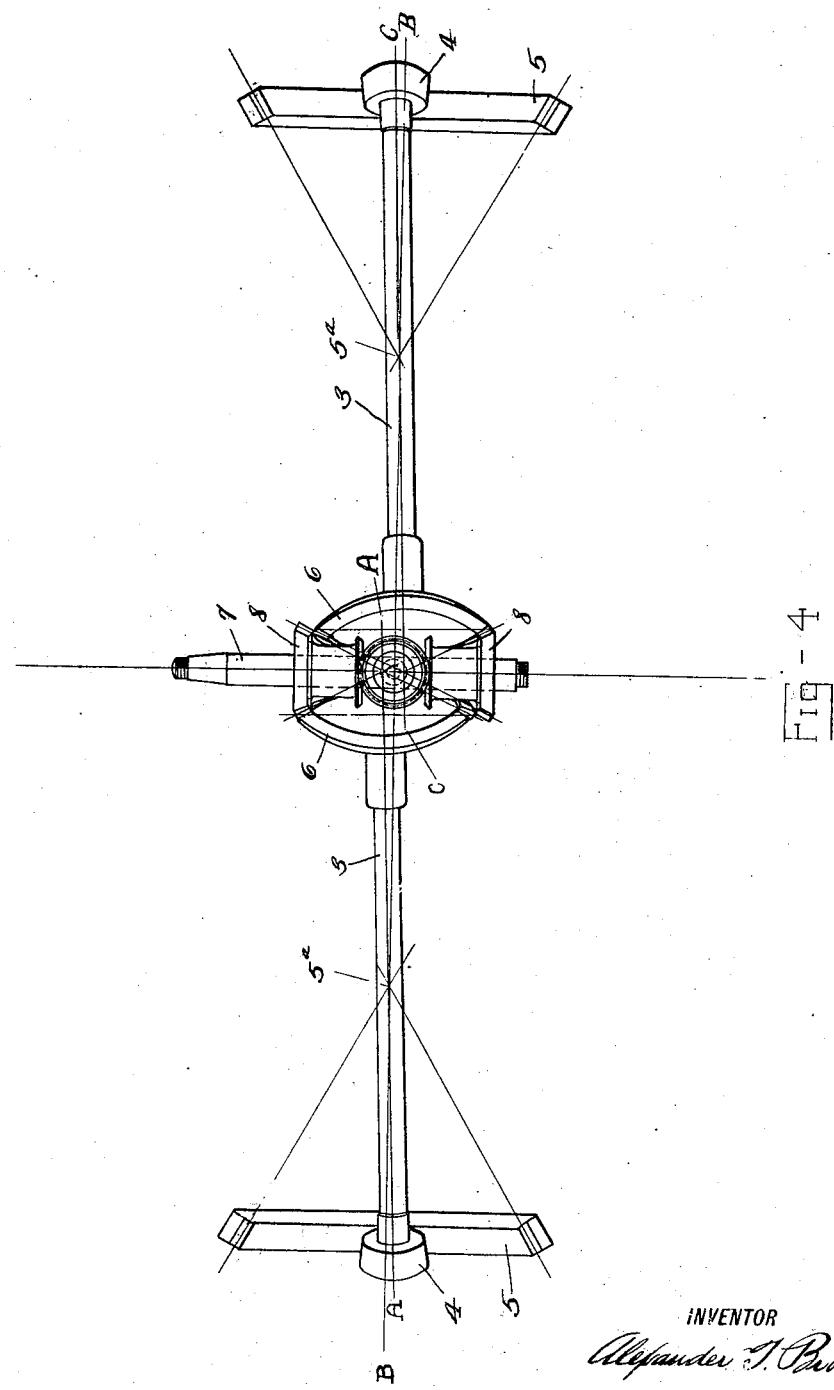

Patented Mar. 13, 1923.

1,447,959

UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A CORPORATION OF NEW YORK.

DRIVING-AXLE CONSTRUCTION.

Application filed March 5, 1918. Serial No. 220,471.

*To all whom it may concern:*

Be it known that I, ALEXANDER T. BROWN, a citizen of the United States, and a resident of Syracuse, in the county of Onondaga and State of New York, have invented a certain new and useful Driving-Axle Construction, of which the following is a specification.

This invention has for its object a driving or rear axle construction which is particularly simple and strong in construction and highly efficient and durable in use, and especially a construction in which there are no right and left parts or in other words, in which the right and left parts are interchangeable. It further has for its object a construction which is readily interchangeable with the worm and worm gear drives of rear or driving axles.

The invention consists in the novel features and in the combinations and constructions hereinafter set forth and claimed.

In describing this invention, reference is had to the accompanying drawings in which characters designate corresponding parts in all the views.

Figure 3 is a sectional view taken on the plane of line 3—3, Fig. 2.

Figure 4 is a plan view illustrating the arrangement of the gears, the contiguous parts of the casing and axle being removed.

Figure 1:
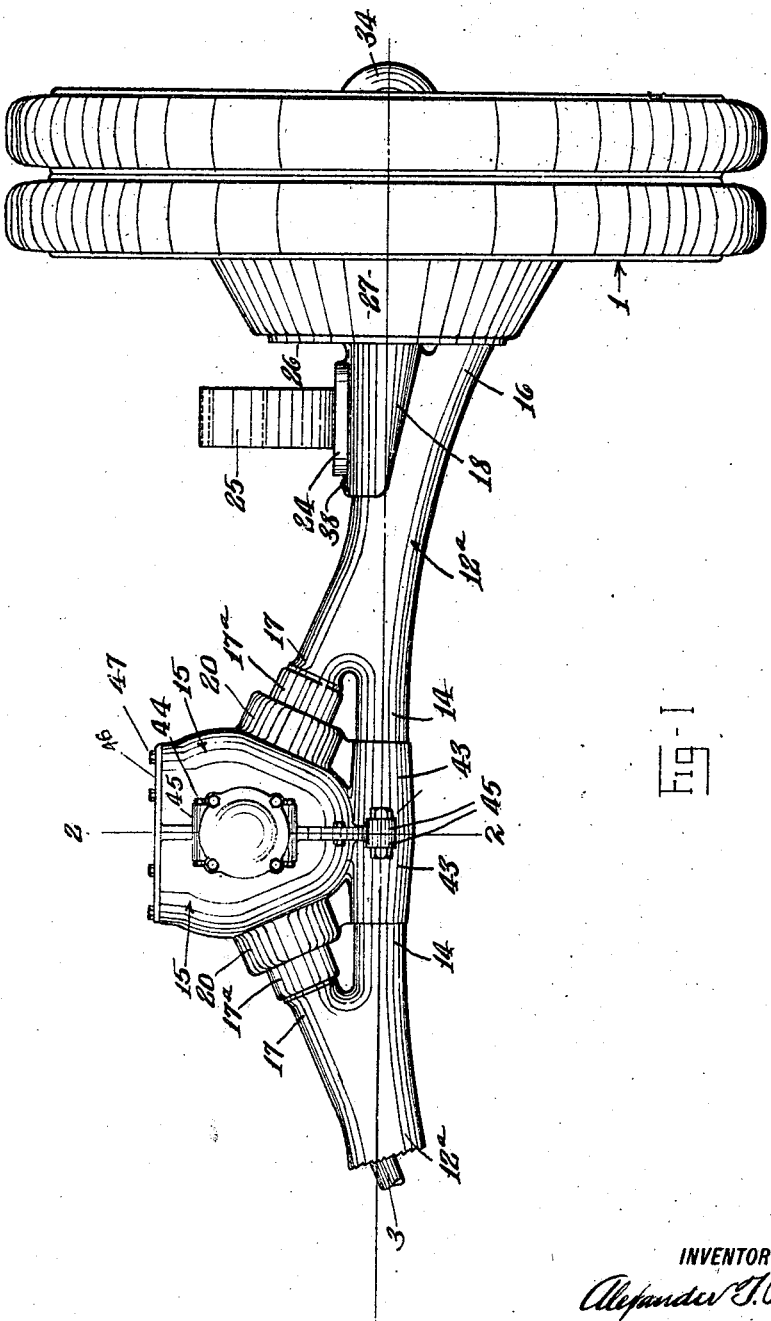
Figure 1 is a rear elevation, partly broken away, of my rear axle construction.
Figure 2:
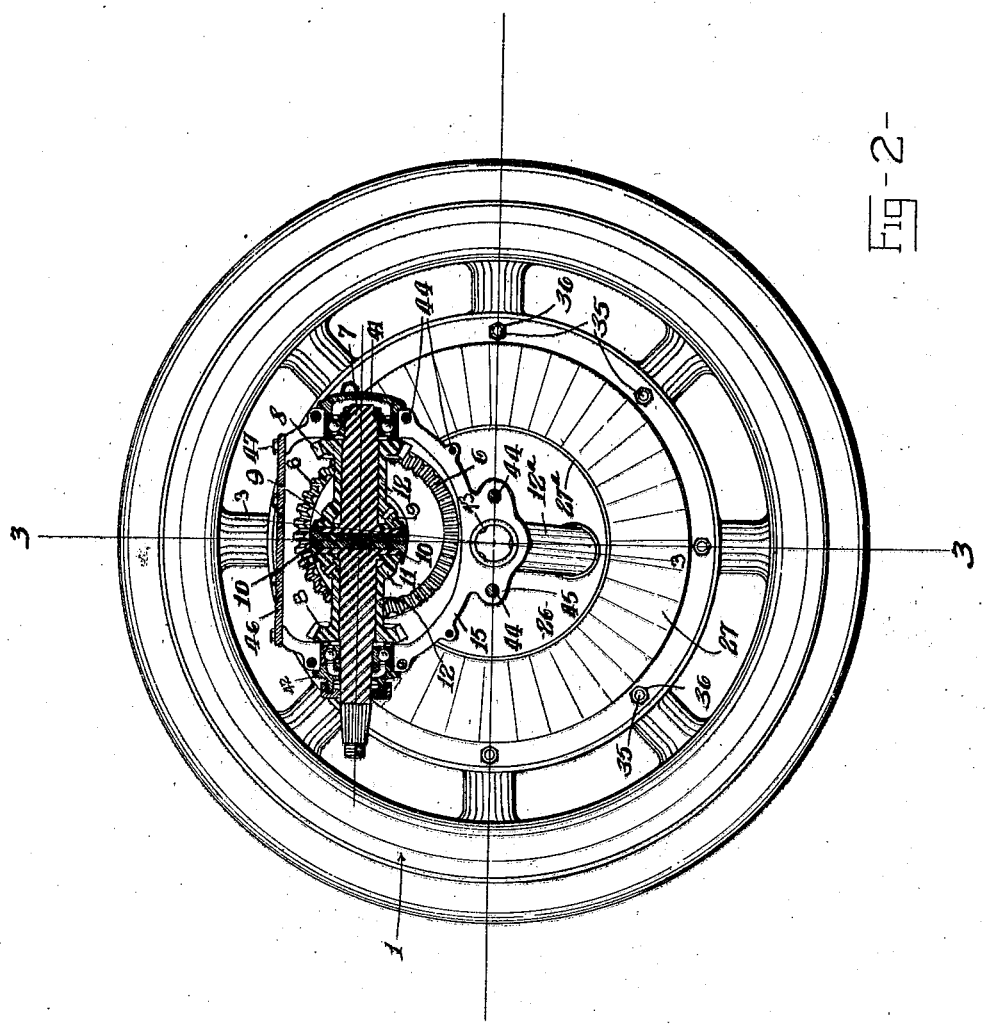
Figure 2 is a sectional view taken on line 2—2, Fig. 1.

This driving axle construction comprises, generally driving elements or wheels, axles on which the wheels are rotatably mounted, shaft sections extending lengthwise of the axles on opposite sides of the center of the axle structure and obliquely relatively to the axles, the outer ends of the shaft sections being connected to the wheels by suitable gearing, driving mechanism connected to the inner ends of the shaft sections, and a frame or casing supporting the axles, shaft sections and driving mechanism. The inclination of each shaft section is out of a vertical plane containing the axes of the axles and also out of the horizontal plane containing said axes, and the outer end of one shaft section and the inner end of the other are arranged on like sides of said planes while the inner end of the former shaft section and the outer end of the latter are arranged on the opposite sides of said planes. This arrangement brings the opposing ends of the shaft sections staggered so that interchangeable gears of equal diameter can be mounted thereon with which the driving gears of equal size mesh respectively, and also permits the gears on the outer ends of the shaft to mesh with gears associated with the driving wheels with the shafts arranged at said oblique angles.

1 designates the driving wheels which may be of any suitable form, size and construction. 2 are the axles or spindles upon which the wheels 1 are mounted, and 3 are the shaft sections which transmit the power from the driving mechanism to the wheels 1.

The axles or spindles 2 are here shown as arranged in horizontal position in axial alinement, and the shaft sections 3 are arranged with their outer ends below the axles 2 and their inner ends above the axis of the axles, and as seen in Fig. 4, one of the shaft sections, as the one to the left in Fig. 4, is arranged with its axial line A—A at its outer end in the rear of the vertical plane of the axial line B—B of the axles 2 and with the axial line A—A at its inner end extending in front of the plane of the line B—B; while the other shaft section 3 is arranged with its axial line C—C at its inner end extending to the rear of the vertical plane of the axis B—B of the axles 2 and its outer end in front of the vertical plane of said axial line B—B. Hence, the axes A—A, C—C of the shaft sections 3 are arranged in vertical substantially parallel planes arranged at oblique angles to the vertical plane containing the axis B—B of the axles 2; and the inner ends of the shaft sections 3 are arranged staggered with respect to each other. The outer ends of the shaft sections 3 are arranged below the horizontal plane of the axes of the axles, and the inner ends thereof above said plane. The shaft sections 3 are thus arranged obliquely relatively to vertical and horizontal planes intersecting in the axis of the axles 2 and said sections intersect the axis of the axles between the gear casing 15 and the outer ends of the axles.

The outer ends of the shaft sections are connected to the driving wheels by bevel gears 4 mounted on the outer ends of said shaft sections and meshing with internal bevel gears 5 associated with the wheels 1. The apexes of the pitch cones of these bevel gears 5 are located at 5ª at the points where the axes of the shaft sections intersect the axes of the axles.

6 are the gears mounted on the inner or staggered ends of the shaft sections 3, these gears being of equal diameter and being interchangeable with each other.

The driving mechanism comprises a shaft 7 extending forwardly and rearwardly between the gears 6, and gears 8 loosely mounted on the shaft 7 and connected by compensating gearing including pinions 9 mounted on spindles 10 rotatable with the shaft 7 and meshing with opposite gears 11 on the hubs 12 of the gears 8. The gears 8 are duplicates and hence interchangeable.

Each of the shafts 3 is located in a suitable casing 12ª having a tubular branch 13 carried by the contiguous axle or spindle 2, a branch 14 alined with the branch 13 and the axle 2, and carried by one of the sections 15 of the casing for the driving and differential mechanism, and also lower and upper additional branches 16 and 17 arranged at an oblique angle to the branches 13 and 14. The branch 16 of the casing 12 is supported at its outer end by a member 18 mounted on the contiguous axle, and the branch 17 by a hub 20 on the contiguous section of the driving and differential gear casing 15. As here shown, the member 18 includes a tubular portion supported by the axle and mounted on the interposed branch 13 of the contiguous casing 12 for the shaft section and has a depending bracket 21 which carries an anti-friction bearing 22 for the outer end of one shaft section 3, and the branch 17 fits into a collar 17ª slidably mounted on the hub 20, and said hub 20 has an enlargement in which are located anti-friction bearings 23 for the inner end of said shaft sections 3. Each member 18 is also formed with a seat 24 for the spring 25 which supports the body of the vehicle and is also provided with an annular flange 26 which coacts with a support 27 for the internal gear 5 of the contiguous wheel 1 to form a housing for said gear 5 and gear meshing therewith.

The support 27 is formed with an internal annular flange 27ª which meets the flange 26, and the inner edge of the flange extends above the teeth of the gears 4, 5 where they mesh so that oil can be filled into the housing 27 to a level above the point where the gears mesh. The support 27 is secured to a discoidal plate 28 having hubs 29 and 30 on opposite sides thereof, the outer hub 29 extending into the bore or axle opening of the wheel 1. Anti-friction bearings 31, 32 are interposed between the outer hub 29 and the outer end of the axle 2 and between the inner hub 30 and the axle 2. A suitable axle nut 33 threads on the end of each axle and a cap 34 of any desirable construction is secured to the outer end of the hub 29.

The disk plate 28 is secured to the support 27 by bolts and nuts 35, 36, and the heads 37 of the bolts enter perforations in the spokes of the wheel, and transmit the torque from the plate 28 to the wheel. Said disk plate 28 is formed with a hand hole normally closed by a cover 28ª threading into the plate. When the wheel 1 is detached and the plate 28 turned to bring the cover 28ª opposite the end of the shaft section 3 and upon removal of the plate 28ª, the shaft section 3 can be removed through the hand hole by removing the nut 3ª and driving gear 6 at the inner end of the shaft section. Also, the nut 3ᵇ at the outer end of the shaft section is accessible for removing the gear 4.

Each casing 12 is preferably made up of two formed or stamped sections, which are welded together, each section containing one-half of each of the branches 13, 14, 16, 17. The branch 13 of each casing 12 is secured to the member 18 and the axle 2 in any suitable manner as by rivets 38. The branch 16 of each casing fits over a sleeve 39 fitted into the bore of the contiguous bracket 21 of the member 18. The axles are usually tubes and are cut off on a bias at 40 to permit the passage of the shafts 3.

The gear case sections 15 are duplicates and interchangeable, the hub 20 of each being arranged forwardly or rearwardly of the vertical plane of the axle so as to be in position to receive the branch 17 of the casing 12.

The drive shaft 7 is supported in bearings held in openings located between the sections, these openings being alike, and the rear opening is closed by a cap 41 which is interchangeable with a gland 42 in the front opening and through which the forward end of the driving shaft 7 extends, which forward end is secured to the engine driven shaft.

The casing 15 is provided on its lower side with bearings 43 for the branches 14 of the casings 12.

The two sections of the gear casing 15 are secured together in any well known manner as by bolts 44 extending transversely through lugs 45 provided at the meeting edges of said sections. The top of the casing is open and covered by a plate 46 held in position in any suitable manner as by cap screws 47.

The gear casing 15 and members 18 constitute the central and end members, and the casings 12, bridging elements of the frame of the axle structure; and owing to the arrangement of said members and elements a particularly strong, light and rigid frame in the form of a truss or arch is provided.

Owing to the staggered and inclined arrangement of the shaft sections 3, the right and left parts of the axle construction are interchangeable and in fact there are no right and left parts, and hence the structure is particularly simple and economical in construction and readily assembled.

Furthermore, owing to the incline of the shaft sections 3 from below the axis of the axle to above the same, this axle construction can be substituted in places where worm gear drives are used, it being understood that when a worm drive is used the driving worm is arranged above the axle and hence any construction to be interchangeable with worm gear drives must have its driving shaft arranged in the same relative position which the worm occupies.

In addition, owing to the branches 14, 17 of the casings 12, connected to the gear casing at points one above the other and to the branches 13, 16 connected to the axle one above the other, a particularly strong arch or truss frame is provided for carrying the body of the vehicle and maximum road clearance is provided as no part of the casing, for the driving and differential gearing extends below the axis of the axles.

What I claim is:

1. In a driving axle construction, the combination of driving wheels, axles on which the wheels are mounted, a supporting casing enclosing the axles, a pair of shaft sections journaled in the casing, the casing being provided with fixed bearings arranged with their axes extending at an incline crosswise of the axles, a pair of shafts journaled in said bearings and geared at their outer ends respectively to said wheels, and driving mechanism supported in the casing and connected to the inner ends of the shaft sections, substantially as and for the purpose described.

2. In a driving axle construction, the combination of driving wheels, axles upon which the wheels are rotatably mounted, shaft sections each arranged lengthwise of and intersecting the axis of the contiguous axle between the central portion of the driving axle construction and the outer ends of the shaft sections and the driving wheels, and driving mechanism connected to the inner ends of said shaft sections, substantially as and for the purpose specified.

3. In a driving axle construction, the combination of driving wheels, axles upon which the wheels are rotatably mounted, shaft sections each extending obliquely crosswise of planes which contain the axis of the axles and are arranged at a right angle to each other, the shaft sections being geared at their outer ends to said wheels, and driving mechanism connected to the inner ends of the shaft sections, substantially as and for the purpose described.

4. In a driving axle construction, the combination of driving wheels, axles upon which the wheels are rotatably mounted, shaft sections each extending obliquely crosswise of planes which contain the axis of the axles and are arranged at a right angle to each other, the shaft sections being connected at their outer ends to said wheels, and driving mechanism connected to the inner ends of the shaft sections, the inner and outer ends of each shaft section extending on opposite sides of one of said planes, and the outer end of one section and the inner end of the other section being arranged on the same side of the other of said planes, substantially as and for the purpose specified.

5. In a driving axle construction, the combination of driving wheels, axles upon which the wheels are rotatably mounted, shaft sections extending obliquely crosswise of the axes of the axles respectively and arranged with their axes intersecting the axes of the axles, fixed bearings for the shaft sections whereby the shaft sections remain in fixed position relatively to the wheels and the axles, the shaft sections being connected to transmit motion at their outer ends to the wheels respectively and driving means connected to the inner ends of said sections, substantially as and for the purpose specified.

6. In a driving axle construction, the combination of driving wheels, axles upon which the wheels are rotatably mounted, shaft sections extending crosswise of the axles and having their outer ends arranged below the axles and connected to the driving wheels and their inner ends arranged above the axis of the axles, and driving means connected to the inner ends of the shaft sections, substantially as and for the purpose described.

7. In a driving axle construction, the combination of driving wheels, axles on which the wheels are rotatably mounted, shaft sections arranged obliquely crosswise of the axles and intersecting the axes of the axles, fixed bearings for the shaft sections, the outer end of one shaft section and the inner end of the other shaft section being arranged in the rear of the vertical plane of the axles and the inner end of the former shaft section and the outer end of the latter being arranged in front of the vertical plane of the axles and driving means connected to the inner ends of the shaft sections, substantially as and for the purpose set forth.

8. In a driving axle construction, the combination of driving wheels, axles upon which the wheels are rotatably mounted, shaft sections extending obliquely crosswise of the axles, the outer ends of said shaft sections being located below the axles and connected to the driving wheels and the inner ends being arranged above the axis of the axles, and the outer end of one shaft section, and the inner end of the other shaft section being arranged to the rear of the vertical plane of the axles, and the inner end of the former shaft section and the outer end of the latter arranged in front of said vertical plane, and driving means connected to the inner ends of the sections, substantially as and for the purpose set forth.

9. A driving axle construction comprising driving wheels having gears associated therewith, axles upon which the wheels are mounted, a pair of shaft sections arranged lengthwise of and at inclined angles to the respective axles and intersecting the axes of the axles, the shaft sections having their inner opposing ends staggered, gears at the outer ends of the shaft sections meshing with the gears associated with the wheels, gears at the inner ends of the shaft sections and driving means including gears meshing with the gears at the inner ends of the shaft sections, substantially as and for the purpose set forth.

10. In a driving axle construction, the combination of driving wheels, axles upon which the wheels are rotatably mounted, gears associated with said wheels, shaft sections inclined opposite to each other out of the horizontal plane containing the axes of the axles, and parallelly out of the vertical plane containing the axes of the axles whereby the inner ends of the shafts are arranged staggered, gears at the outer ends of the shaft sections meshing with the former gears, gears of equal size at the inner ends of the shaft sections, and driving mechanism including gears of equal size coacting with the last mentioned gears, substantially as and for the purpose set forth.

11. In a driving axle construction, the combination of a frame including a central and end members, bridging elements between said members, and axles supported by the end members, the bridging elements being connected at their outer ends to said members below the axles and at their inner ends to the central member above the axis of the axles, substantially as and for the purpose specified.

12. In a driving axle construction, the combination of a frame including a central and end members, bridging elements between the members, and axles carried by the end members, the bridging elements being connected to the end members contiguous to the axles, and below the axles, and to the central member above the axes of the axles, substantially as and for the purpose set forth.

13. In a driving axle construction, the combination of a frame including a central and end members, bridging elements between the members, and axles carried by the end members, the bridging elements being connected to the end members contiguous to the axles and below the axles, and to the central member near the axis of the axles and above the axis of the axles, substantially as and for the purpose described.

14. In a driving axle construction, the combination of a frame including a central and end members, bridging elements between said members and axles carried by the end members, each bridging element having tubular branches, one of which encloses the adjacent axle, and the other of which extends below said axle and is connected to the contiguous end member and branches connected one to the central member near the axis of the axles and the other to the central member above said axis, substantially as and for the purpose set forth.

15. In a driving axle construction, the combination of a frame including a central and end members, bridging elements between said members, axles supported by the end members, the bridging elements being connected at their outer ends to said end members below the axles and at their inner ends to the central member above the axis of the axles, and shaft sections arranged obliquely relatively to the respective axles and lengthwise of the bridging elements and being journaled at their ends in the central member and the end members, substantially as and for the purpose described.

16. In a driving axle construction, the combination of a frame, including a central and end members, bridging elements between the members, axles carried by the end members, the bridging elements being connected to the end members contiguous to the axles and below the axles and to the central member above the axes of the axles, and shaft sections arranged obliquely relatively to the respective axles and lengthwise of the bridging elements and being journaled at their ends in the central member and the end members, substantially as and for the purpose specified.

17. In a driving axle construction, the combination of a frame including a central and end members, bridging elements between said members, axles carried by the end members, each bridging element having tubular branches, one of which encloses the adjacent axle, and the other of which extends below said axle and is connected to the contiguous end member, and branches one connected to the central member near the axis of the axles and the other to the central member above said axles, and shaft sections arranged obliquely relatively to the axles and extending through the branches extending above and below the axis of the axles, and being journaled at their ends in the central member and the end members respectively, substantially as and for the purpose set forth.

18. In a driving axle construction, the combination of driving wheels, axles upon which the wheels are rotatably mounted, driving shaft sections extending obliquely lengthwise of the axles and their outer ends located below the axles, gears at the outer ends of said sections, oil containers carried by the wheels, gears located in the containers and rotatable therewith and meshing with the former gears, driving means connected to the inner ends of the sections, each container being open at its inner end, and disks fixed relatively to the axles and meeting the inner edges of the containers, the gears meshing in the containers below the level of the lowermost points of the meeting edges of the containers and disks, substantially as and for the purpose specified.

In testimony whereof, I have hereunto signed my name, at Syracuse, in the county of Onondaga, and State of New York, this 18th day of February, 1918.

ALEXANDER T. BROWN.